W. E. LOWRIE.
Plow or Cultivator.
No. 219,745. Patented Sept. 16, 1879.
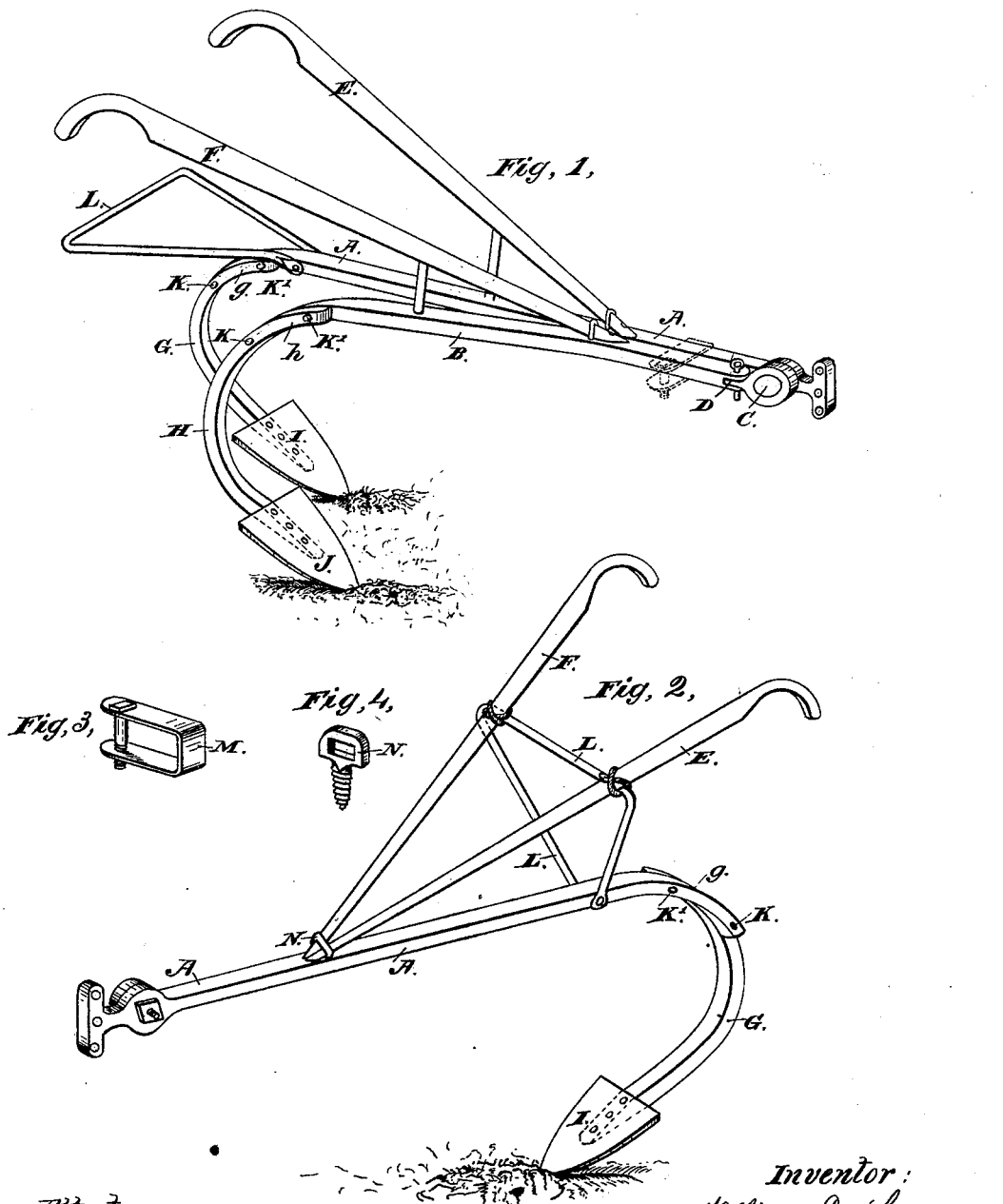

UNITED STATES PATENT OFFICE.

WILLIAM E. LOWRIE, OF CLEAR PORT, OHIO.

IMPROVEMENT IN PLOWS OR CULTIVATORS.

Specification forming part of Letters Patent No. 219,745, dated September 16, 1879; application filed May 22, 1879.

*To all whom it may concern:*

Be it known that I, WILLIAM E. LOWRIE, of Clear Port, in the county of Fairfield and State of Ohio, have invented an Improved Plow or Cultivator, of which the following is a specification.

The subject of this invention is a plow or cultivator with two shares attached to separate beams, which are removably connected in front to admit of their separation, and are also provided with vertical and horizontal pivots to admit of a horizontal or vertical movement of the shares while in operation, one handle being connected independently to each beam.

A triangular brace attached to the main beam is adapted for the rigid connection of both the handles when it may be desired to use the implement as a single plow or as a double plow without independent motion. A clip-brace is further provided to clamp the two beams near the front when they are to be fixed rigidly together, and a screw-eye to take the place of the single eye and receive the points of both handles on one beam when the other beam is laid aside.

In order that my invention may be fully understood, I will proceed to describe it with reference to the accompanying drawings, in which—

Figure 1 is a perspective view of the complete implement. Fig. 2 is a perspective view of the same converted to form a single plow with two handles. Fig. 3 is a perspective view of the clip-brace for clamping the beams together when desired. Fig. 4 is a perspective view of a screw-eye to be applied for the attachment of both handles to one beam.

A B represent two beams, connected together in front by a horizontal pivot, C, and vertical pivot D, permitting vertical and horizontal motion. E F are handles, attached independently to the respective beams. G H represent standards carrying shares I J, and connected to the beams A B, as shown, by lap or splice joints *g h*, and each with two bolts, K K', for the upper one, K', of which may be substituted a wooden pin, to break in the event of an undue strain, which might otherwise injure the implement. The lap-shoulder of the standard acts as a brace and support where the greatest strain is sustained.

L represents a triangular brace, hinged to the main beam A, and adapted for the attachment of the respective handles when the implement is to be used as a single plow, as illustrated in Fig. 2, or as a double plow without independent motion in the shares.

M represents a clip, extending across the two beams near their front, as shown in dotted lines in Fig. 1, so as to fasten them rigidly together when it is desired to use a double plow without independent motion.

When the implement is converted into a single plow, the secondary beam, B, is laid aside, and a screw-eye, N, (shown in Fig. 4, and in position in Fig. 2,) is substituted for the single eye, (shown in Fig. 1,) so that the points of both handles may be fixed to one beam.

Having thus described my invention, the following is what I claim as new therein and desire to secure by Letters Patent:

1. The combination, with the beams A and B, connected together by horizontal and vertical pivots C D, of the handles E F, connected independently to said beams, as described.

2. A double plow constructed with a main beam, A, a secondary beam, B, connected to the first by horizontal and vertical pivots C and D, handles E F, attached independently to the said beams, and a clip-brace, M, for fixing the beams rigidly together when desired, all substantially as herein set forth.

3. The combination, with beams A B, connected by horizontal and vertical pivots C D, and handles E F, of the clip-brace M and triangular hinged brace L, for rigidly securing the beams and handles, as described.

WM. E. LOWRIE.

Witnesses:
 C. F. WOLF,
 L. ABBOTT.